United States Patent
Ravikumar et al.

(10) Patent No.: US 7,870,131 B2
(45) Date of Patent: Jan. 11, 2011

(54) MITIGATION OF SEARCH ENGINE HIJACKING

(75) Inventors: Shanmugasundaram Ravikumar, Berkeley, CA (US); Bo Pang, Sunnyvale, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 517 days.

(21) Appl. No.: 11/956,055

(22) Filed: Dec. 13, 2007

(65) Prior Publication Data
US 2009/0157646 A1    Jun. 18, 2009

(51) Int. Cl.
*G06F 7/00* (2006.01)
(52) U.S. Cl. .................. 707/736; 707/748; 707/769
(58) Field of Classification Search ................ 707/748, 707/736, 769
See application file for complete search history.

(56) References Cited

U.S. PATENT DOCUMENTS

| | | | |
|---|---|---|---|
| 2006/0242040 A1* | 10/2006 | Rader | 705/35 |
| 2006/0294086 A1 | 12/2006 | Rose et al. | |
| 2006/0294134 A1 | 12/2006 | Berkhim et al. | |
| 2009/0248484 A1* | 10/2009 | Surendran et al. | 705/10 |

* cited by examiner

*Primary Examiner*—Charles Rones
*Assistant Examiner*—Belix M Ortiz
(74) *Attorney, Agent, or Firm*—Berkeley Law & Technology Group, LLP

(57) ABSTRACT

The subject matter disclosed herein relates to mitigation of search engine hijacking. In one example implementation, a sentiment value associated with anchortext in a search engine result may be determined. Similarly, a sentiment value of one or more web pages referenced by the anchor text may also be determined. A divergence between sentiment values associated with the anchortext and a web page may then determined.

20 Claims, 2 Drawing Sheets

MITIGATION OF SEARCH ENGINE HIJACKING

BACKGROUND

1. Field

Figure 1:
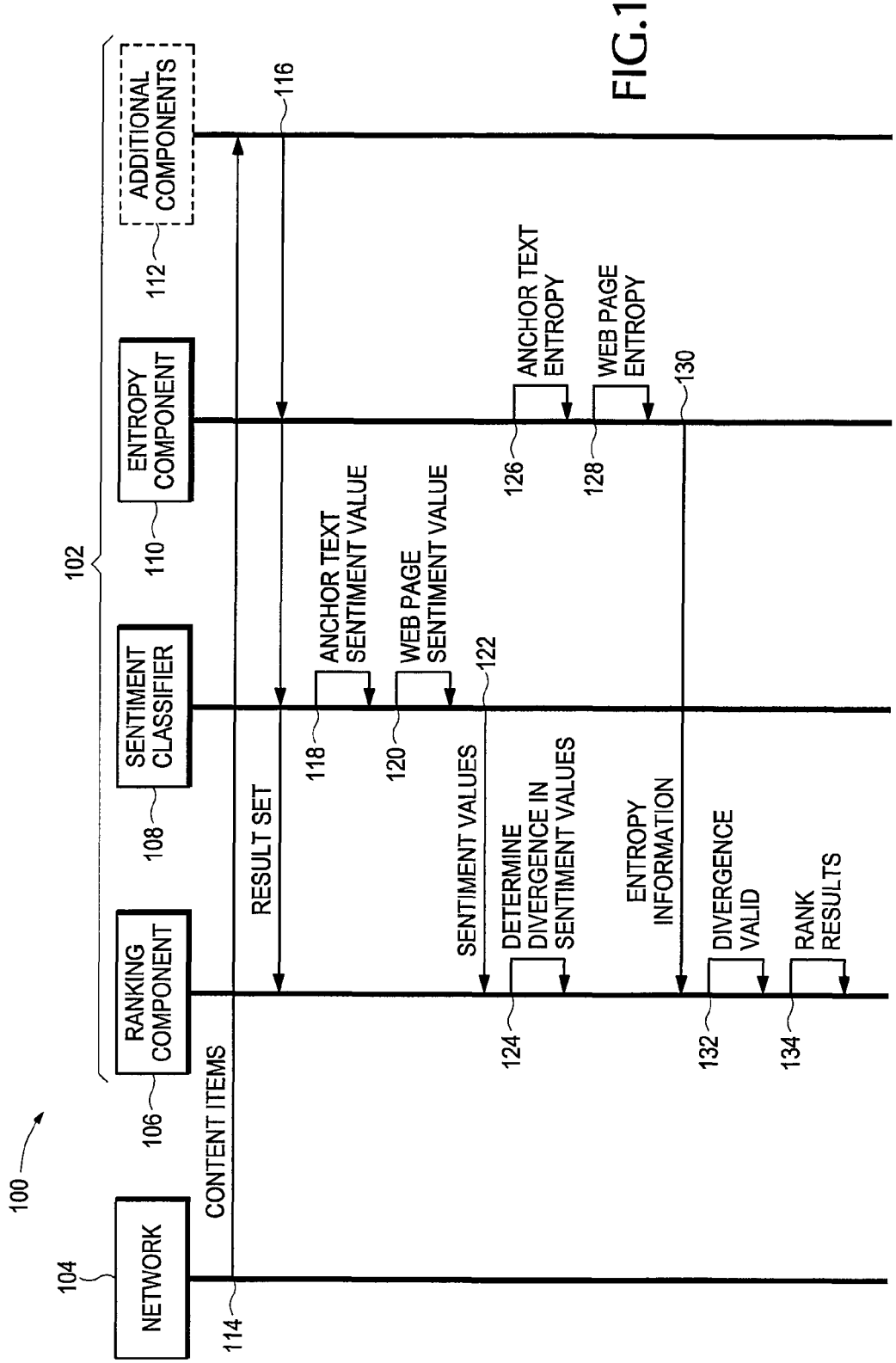

The subject matter disclosed herein relates to mitigation of search engine hijacking.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be located or otherwise identified in an efficient manner.

DESCRIPTION OF THE DRAWING FIGURES

Figure 2:
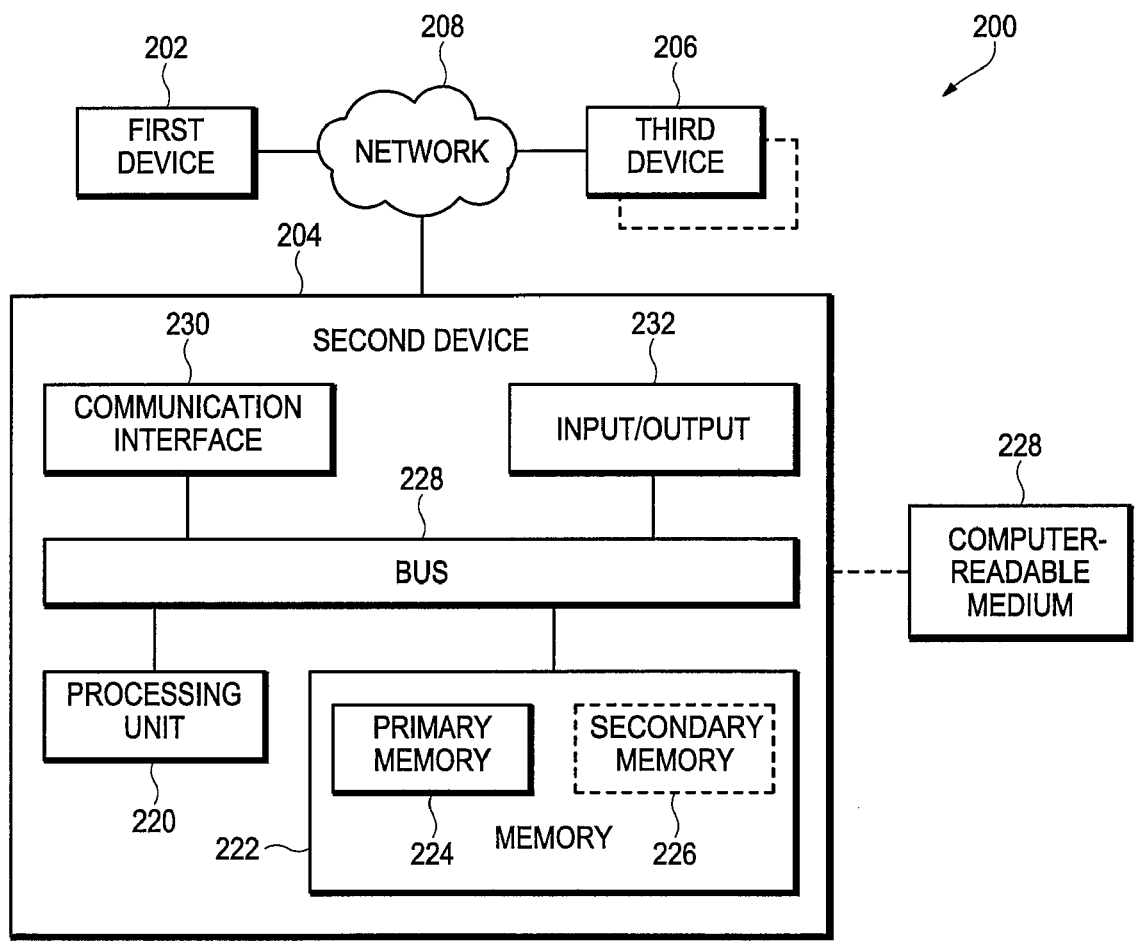

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

FIG. 1 is a flow diagram illustrating a procedure for mitigation of search engine hijacking in accordance with one or more embodiments; and FIG. 2 is a schematic diagram of a computing platform in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

The Internet is a worldwide network of interconnected networks, which includes both public and private local and wide area networks of computers. One of the most commonly used Internet services is the World Wide Web ("WWW"), which consists of billions of content items, known as web pages, interconnected by hypertext links which allow users to navigate from a "source" page (the page containing the link) to a "target" page (the page pointed to by the link). Each page on the Web has a unique address known as a Uniform Resource Locator ("URL"). Hypertext links on the web contain two pieces of information: the URL of the target page, and a short piece of text, known as anchortext, that describes the target page.

Due to the large scale of the Internet and the unique nature of the interlinked pages, search engines may employ complex relevance ranking functions. In addition to the ranking features, search engines may also rely on information based on the connectivity of the page, such as the number of pages linking to it, in determining the relevance score of a search result.

Unfortunately, users may be presented with disinformation when attempting to locate content items on the Internet. Due to the exploitation of shortcomings in existing search engines, users may be confronted with issues of trust regarding content items that they locate on the Internet, including the content contained within such content items.

For example, anchortext is often of help in web information retrieval by search engines. However, this feature may be abused by malicious agents in order to hijack results from a search engine. For example, such hijacking may typically take one of two forms. First, such hijacking may occur by making an invalid anchortext point to a valid target web page. For example, an invalid anchortext may be made reciting "miserable failure", where such anchortext points to the valid US president web page. Second, such hijacking may occur by making a valid anchortext point to an invalid target web page. For example, a valid anchortext may be made reciting "French military victories" that points to an invalid web page regarding French military defeats. As will be described in greater detail below, new sources of information on which to base searches, as well as processes of using the same, may be utilized to detect such search engine hijackings.

Procedure 100 illustrated in FIG. 1 may be used to detect search engine hijackings in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 governs the operation of a search engine 102. Search engine 102 may be capable of searching for content items of interest. Search engine 102 may communicate with a network 104 to access and/or search available information sources. By way of example, but not limitation, network 104 may include a local area network, a wide area network, the like, and/or combinations thereof, such as, for example, the Internet. Additionally or alternatively, search engine 102 and its constituent components may be deployed across network 104 in a distributed manner, whereby components may be duplicated and/or strategically placed throughout network 104 for increased performance.

Search engine 102 may include multiple components. For example, search engine 102 may include a ranking component 106, a sentiment classifier 108, and/or an entropy component 110, as will be discussed in greater detail below. Additionally or alternatively, search engine 102 may also include additional components 112 that are not described in detail herein. For example, search engine 102 may also include a crawler component capable of retrieving content items from network 104, illustrated at action 114. Additionally or alternatively, search engine 102 also may include a search component capable of searching the content items retrieved by the crawler component. Ranking component 106, sentiment classifier 108, and/or entropy component 110 may receive such a result set from the search component, illustrated at action 116. Ranking component 106 may be capable of ranking the result set such that the most relevant content items in the result set are presented to a user first, according to descending relevance. For example, the first content item in the result set may be the most relevant in response to a query and the last content item in the result set may be the least relevant while still falling within the scope of the query.

Additionally, although the additional components 112 of search engine 102 as shown in FIG. 1 have been described above with non-limiting example components, the examples given do not necessarily limit claimed subject matter to any particular configuration. For example, further additional components 112 not discussed with respect to FIG. 1 may be employed, without departing from the scope of claimed subject matter. Further, although the additional components 112 of search engine 102, as shown in FIG. 1, have been described above with non-limiting example components, the examples given may be eliminated, without departing from the scope of claimed subject matter.

Once sentiment classifier 108 has received a result set at action 116, sentiment classifier 108 may determine a sentiment value associated with the anchortext and/or web pages from the result set. For example, sentiment classifier 108 may be capable of processing anchortext and/or web pages to classify at least a portion of the anchortext and/or web pages as having a common attribute. For example, such a common attribute may comprise a determined sentiment value for each anchortext. Such a sentiment value may, for example, relate a ranking associated with the attributes of the anchortext. Thus, for example, an anchortext may be ranked to have a sentiment value on a designated scale between 0 (unacceptable sentiment value) and 1 (acceptable sentiment value).

For example, sentiment classifier 108 may associate unacceptable sentiment values with words identified as having a negative connotation, off-putting language, slandering language, disapproving language, and/or the like. Likewise, sentiment classifier 108 may associate acceptable sentiment values with words that do not fall under the classification for unacceptable sentiment values and/or may positively associate acceptable sentiment values with words identified as having a positive connotation, objective connotation, and/or the like.

For example, at action 118 sentiment classifier 108 may be capable of processing anchortext to classify at least a portion of the anchortext as having a given sentiment value. Likewise, at action 120, for example, sentiment classifier 108 may be capable of processing web pages to classify at least a portion of the web pages as having a given sentiment value.

Sentiment values associated with anchortexts and the sentiment values associated with web pages may be sent to ranking component 106 at action 122. At action 124, ranking component 106 may determine whether there is a divergence between the sentiment value associated with an anchortext and the sentiment value associated with a web page. For example, in a situation where the sentiment value associated with an anchortext has a value approaching (0) and the sentiment value associated with a web page has a value approaching (1), ranking component 106 may determine that there is a significant divergence. Such a divergence may be an indication that there has been an attempt to hijack the results of the search engine 102. However, such a divergence may not necessarily be dispositive in and of itself in determining that there has been an attempt to hijack the results of the search engine 102.

Once entropy component 110 has received a result set at action 116, entropy component 110 may evaluate the entropy associated with the anchortext and/or web pages from the result set. As used herein, the term "entropy" may refer to a fundamental measure the uncertainty represented by a probability distribution. By way of example, given a discrete distribution $\bar{p}$ on symbols[n] specified in the form of a vector $\bar{p}=p_1, \ldots, p_n$ with $p_i \geq 0$ and $\Sigma_i\, p_i = 1$, the Shannon entropy H($\bar{p}$) is given by $\Sigma_{i=1}^{n} p_i \lg(1/p_i)$. However, this is merely one expression of entropy according to a particular embodiment and claimed subject matter is not limited in this respect.

For example, entropy component 110 may be capable of processing anchortext and/or web pages to analyze distribution data associated with the anchortext and/or web pages of a result set to measure the extent to which the item is topic-focused. It may be useful to determine to what extent a result set is "focused". Here, by way of example, but not limitation, such an item may be considered "focused" if its membership is "scattered" as little as possible. One approach might be to interpret the result set as a probability distribution, and use the Shannon entropy of this distribution as a measure of its focus.

For example, at action 126, entropy component 110 may be capable of analyzing distribution data associated with the anchortext of a result set to measure the extent to which the item is topic-focused. Likewise, at action 128, for example, entropy component 110 may be capable of analyzing distribution data associated with the web pages of a result set to measure the extent to which the item is topic-focused.

Entropy information associated with anchortexts and entropy information associated with web pages may be sent to ranking component 106 at action 130. At action 124, ranking component 106 may determine whether a divergence between the sentiment value associated with the anchortext and the sentiment value associated with the web page is a valid condition. For example, entropy information sent at action 130 may be utilized by ranking component 106 to assess whether such a divergence is a valid condition. Specifically, such a divergence may not necessarily be dispositive in and of itself in determining that there has been an attempt to hijack the results of the search engine 102. Accordingly, ranking component 106 may utilize the entropy information sent at action 130 to estimate whether such a divergence may be a normal occurrence or may be a result of an attempt to hijack the results of the search engine 102.

For example, hijacking of search engine 102 may be indicated in cases where anchortext has a sentiment value that is unacceptable and the web page has a sentiment value that is acceptable. Ranking component 106 may determine that such hijacking is occurring if a set of web pages containing the anchortext has a distribution with low entropy, and if a majority of anchortexts within a set of anchortexts referencing the web page have an acceptable sentiment value. In such a case, the unacceptable anchortext sentiment value diverges from the acceptable web page sentiment value, and such divergence may be shown not to be a normal occurrence due to the low entropy of the set of web pages containing the anchortext.

More specifically, given an anchortext-page pair (q, p), a sentiment classifier 108 may be applied to the anchortext and the web page separately, resulting in the sentiment of the anchortext (C(p)) and the sentiment of the web page (C(q)). In the case where C(p) U C(q)={acceptable, unacceptable}, a determination may be made to see whether the anchortext q is trying to hijack web page p. Where Pq is the set of all pages with anchortext q, and Qp is the set of all anchortexts for page p, hijacking may be indicated where C(p)={acceptable} and C(q)={unacceptable}. This may correspond to a case in which an invalid anchortext tries to hijack a valid web page. In this case, anchortext q may be declared as hijacking page p if the multi-set Pq, treated as a distribution, has low entropy and if most of the anchortext in the set Qp are "acceptable". Such a result may indicate that the goal of the anchortext q is to slander web page p as web page p is also indicated as having a significant amount of other "labelings"(in the form of diverse, and mostly "acceptable" anchortexts).

Likewise, for example, hijacking of search engine 102 may be indicated in cases where anchortext has a sentiment value that is acceptable and the web page has a sentiment value that is unacceptable. Ranking component 106 may determine that such hijacking is occurring if a set of anchortexts referencing the web page has a distribution with low entropy, and if a majority of web pages within a set of web pages containing the anchortext have an acceptable sentiment value. In such a case, the acceptable anchortext sentiment value diverges from the unacceptable web page sentiment value, and such divergence may be shown not to be a normal occurrence due to the low entropy of the set of anchortexts referencing the web page.

More specifically, hijacking may be indicated where C(p)={unacceptable} and C(q)={acceptable}. This may correspond to the case when a seemingly valid anchortext q tries to point to an invalid web page p. In this case, the multi-set Qp of all anchortexts for web page p may be considered. Web page p may be declared as hijacking anchortext q if the multi-set Qp, treated as a distribution, has low entropy and if most of the pages in the set Pq are "acceptable". Such a result may indicate that the goal of the web page p is to hijack a certain anchortext q (in the sense that web page p is not pointed to by a diverse set of anchortexts) whereas q is a legitimate anchortext meant to point to other "acceptable" web pages.

At action 134, ranking component 106 may determine a ranking result ordering the result set. Ranking component 106 may be capable of ranking the result set such that the most relevant content items in the result set are presented to a user first, preferably according to descending relevance. For example, the first content item in the result set may be the most relevant in response to a query and the last content item in the result set may be the least relevant while still falling within the scope of the query. For example, ranking component 106 may eliminate invalid search results and/or lower the rank of such eliminate invalid search results. Accordingly, ranking component 106 may determine a search engine result based, at least in part, on a sentiment value from anchortext and/or from web pages.

FIG. 2 is a schematic diagram illustrating an exemplary embodiment of a computing environment system 200 that may include one or more devices configurable to mitigate search engine hijacking using one or more techniques illustrated above, for example. System 200 may include, for example, a first device 202, a second device 204, and a third device 206, which may be operatively coupled together through a network 208.

First device 202, second device 204, and third device 206, as shown in FIG. 2, may be representative of any device, appliance or machine that may be configurable to exchange data over network 208. By way of example, but not limitation, any of first device 202, second device 204, or third device 206 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 208, as shown in FIG. 2, is representative of one or more communication links, processes, and/or resources configurable to support the exchange of data between at least two of first device 202, second device 204, and third device 206. By way of example, but not limitation, network 208 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 206, there may be additional like devices operatively coupled to network 208.

It is recognized that all or part of the various devices and networks shown in system 200, and the processes and methods as further described herein, may be implemented using, or otherwise including, hardware, firmware, software, or any combination thereof.

Thus, by way of example, but not limitation, second device 204 may include at least one processing unit 220 that is operatively coupled to a memory 222 through a bus 228.

Processing unit 220 is representative of one or more circuits configurable to perform at least a portion of a data computing procedure or process. By way of example, but not limitation, processing unit 220 may include one or more processors, controllers, microprocessors, microcontrollers, application specific integrated circuits, digital signal processors, programmable logic devices, field programmable gate arrays, and the like, or any combination thereof.

Memory 222 is representative of any data storage mechanism. Memory 222 may include, for example, a primary memory 224 and/or a secondary memory 226. Primary memory 224 may include, for example, a random access memory, read only memory, etc. While illustrated in this example as being separate from processing unit 220, it should be understood that all or part of primary memory 224 may be provided within or otherwise co-located/coupled with processing unit 220.

Secondary memory 226 may include, for example, the same or similar type of memory as primary memory and/or one or more data storage devices or systems, such as, for example, a disk drive, an optical disc drive, a tape drive, a solid state memory drive, etc. In certain implementations, secondary memory 226 may be operatively receptive of, or otherwise configurable to couple to, a computer-readable medium 228. Computer-readable medium 228 may include, for example, any medium that can carry and/or make accessible data, code and/or instructions for one or more of the devices in system 200.

Second device 204 may include, for example, a communication interface 230 that provides for or otherwise supports the operative coupling of second device 204 to at least network 208. By way of example, but not limitation, communication interface 230 may include a network interface device or card, a modem, a router, a switch, a transceiver, and the like.

Second device 204 may include, for example, an input/output 232. Input/output 232 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 232 may include an operatively configured display, speaker, keyboard, mouse, trackball, touch screen, data port, etc.

With regard to system 200, in certain implementations, first device 202 may be configurable to mitigate search engine hijacking using one or more techniques illustrated above. For example, a mitigation of search engine hijacking procedure may operate by having first device 202 access network 208 to retrieve content items for the creation of a result set. Based on the result set, first device 202 may determine a search engine result based, at least in part, on a sentiment value from anchor-text and/or from web pages of the result set.

It should also be understood that, although particular embodiments have just been described, the claimed subject matter is not limited in scope to a particular embodiment or implementation. For example, embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description above.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

Unless specifically stated otherwise, as apparent from the preceding discussion, it is appreciated that throughout this specification discussions utilizing terms such as processing, computing, calculating, selecting, forming, transforming, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
    determining a sentiment value associated with the anchortext;
    determining a sentiment value of a web page referenced by anchortext in a search engine result; and
    detecting a divergence between the sentiment value associated with the anchortext and the sentiment value associated with the web page.

2. The method of claim 1, further comprising:
    determining whether said divergence between the sentiment value associated with the anchortext and the sentiment value associated with the web page is a valid condition.

3. The method of claim 1, further comprising:
    determining whether said divergence between the sentiment value associated with the anchortext and the sentiment value associated with the web page is a valid condition in a case where anchortext has a sentiment value that is unacceptable and the web page has a sentiment value that is acceptable based, at least in part, on:
    whether a set of web pages containing the anchortext has a distribution with low entropy, and
    whether a majority of anchortexts within a set of anchortexts referencing the web page have an acceptable sentiment value.

4. The method of claim 1, further comprising:
    determining whether said divergence between the sentiment value associated with the anchortext and the sentiment value associated with the web page is a valid condition in cases where anchortext has a sentiment value that is acceptable and the web page has a sentiment value that is unacceptable based, at least in part, on:
    whether a set of anchortexts referencing the web page has a distribution with low entropy, and
    whether a majority of web pages within a set of web pages containing the anchortext have an acceptable sentiment value.

5. An article of manufacture comprising:
    a storage medium comprising machine-readable instructions stored thereon which are executable by a computing platform to:
    determine a sentiment value associated with the anchortext;
    determine a sentiment value of a web page referenced by the anchortext; and
    detecting a divergence between the sentiment value associated with the anchortext and the sentiment value associated with the web page.

6. The article of claim 5, wherein said machine-readable instructions are further executable by said computing platform to:
    determine whether said divergence between the sentiment value associated with the anchortext and the sentiment value associated with the web page is a valid condition.

7. The article of claim 5, wherein said machine-readable instructions are further executable by said computing platform to:
    determine whether said divergence between the sentiment value associated with the anchortext and the sentiment value associated with the web page is a valid condition in a case where anchortext has a sentiment value that is unacceptable and the web page has a sentiment value that is acceptable based, at least in part, on:
    whether a set of web pages containing the anchortext has a distribution with low entropy, and
    whether a majority of anchortexts within a set of anchortexts referencing the web page have an acceptable sentiment value.

8. The article of claim 5, wherein said machine-readable instructions are further executable by said computing platform to:
    determining whether said divergence between the sentiment value associated with the anchortext and the sentiment value associated with the web page is a valid condition in a case where anchortext has a sentiment value that is acceptable and the web page has a sentiment value that is unacceptable based, at least in part, on:
    whether a set of anchortexts referencing the web page has a distribution with low entropy, and
    whether a majority of web pages within a set of web pages containing the anchortext have an acceptable sentiment value.

9. An apparatus comprising:
    a computing platform, said computing platform being adapted to:
    determine a sentiment value associated with anchortext in a search engine result;
    determine a sentiment value of a web page referenced by the anchortext; and
    detect a divergence between the sentiment value associated with the anchortext and the sentiment value associated with the web page.

10. The apparatus of claim 9, wherein said computing platform is further adapted to:
    determine whether said divergence between the sentiment value associated with the anchortext and the sentiment value associated with the web page is a valid condition.

11. The apparatus of claim 9, wherein said computing platform is further adapted to:
    determine whether said divergence between the sentiment value associated with the anchortext and the sentiment value associated with the web page is a valid condition in a case where anchortext has a sentiment value that is unacceptable and the web page has a sentiment value that is acceptable based, at least in part, on:
- whether a set of web pages containing the anchortext has a distribution with low entropy, and
- whether a majority of anchortexts within a set of anchortexts referencing the web page have an acceptable sentiment value.

12. The apparatus of claim 9, wherein said computing platform is further adapted to:
- determine whether said divergence between the sentiment value associated with the anchortext and the sentiment value associated with the web page is a valid condition in a case where anchortext has a sentiment value that is acceptable and the web page has a sentiment value that is unacceptable based, at least in part, on:
- whether a set of anchortexts referencing the web page has a distribution with low entropy, and
- whether a majority of web pages within a set of web pages containing the anchortext have an acceptable sentiment value.

13. An apparatus comprising:
- means for determining a sentiment value associated with anchortext of a search engine result and for determining a sentiment value of a web page referenced by the anchortext; and
- means for determining whether there is a divergence between the sentiment value associated with the anchortext and the sentiment value associated with the web page.

14. The apparatus of claim 13, and further comprising:
- means for determining whether said divergence between the sentiment value associated with the anchortext and the sentiment value associated with the web page is a valid condition.

15. The apparatus of claim 13, and further comprising:
- means for determining whether said divergence between the sentiment value associated with the anchortext and the sentiment value associated with the web page is a valid condition in a case where anchortext has a sentiment value that is unacceptable and the web page has a sentiment value that is acceptable based, at least in part, on:
- whether a set of web pages containing the anchortext has a distribution with low entropy, and
- whether a majority of anchortexts within a set of anchortexts referencing the web page have an acceptable sentiment value.

16. The apparatus of claim 13, further comprising: means for determining whether said divergence between the sentiment value associated with the anchortext and the sentiment value associated with the web page is a valid condition in a case where anchortext has a sentiment value that is acceptable and the web page has a sentiment value that is unacceptable based, at least in part, on:
- whether a set of anchortexts referencing the web page has a distribution with low entropy, and
- whether a majority of web pages within a set of web pages containing the anchortext have an acceptable sentiment value.

17. The method of claim 1, and further comprising detecting that said search engine result has been hijacked based, at least in part, on said detected divergence.

18. The article of claim 5, wherein said instructions are further executable by said computing platform to detect that said search result has been hijacked based, at least in part, on said detected divergence.

19. The apparatus of claim 9, wherein said computing platform is further adapted to detect that said search result has been hijacked based, at least in part, on said detected divergence.

20. The apparatus of claim 13, and further comprising:
- Means for detecting that said search result has been hijacked based, at least in part, on said detected divergence.

* * * * *